Oct. 20, 1936. H. CORY 2,058,136
VACUUM COFFEE BREWER
Filed May 28, 1936
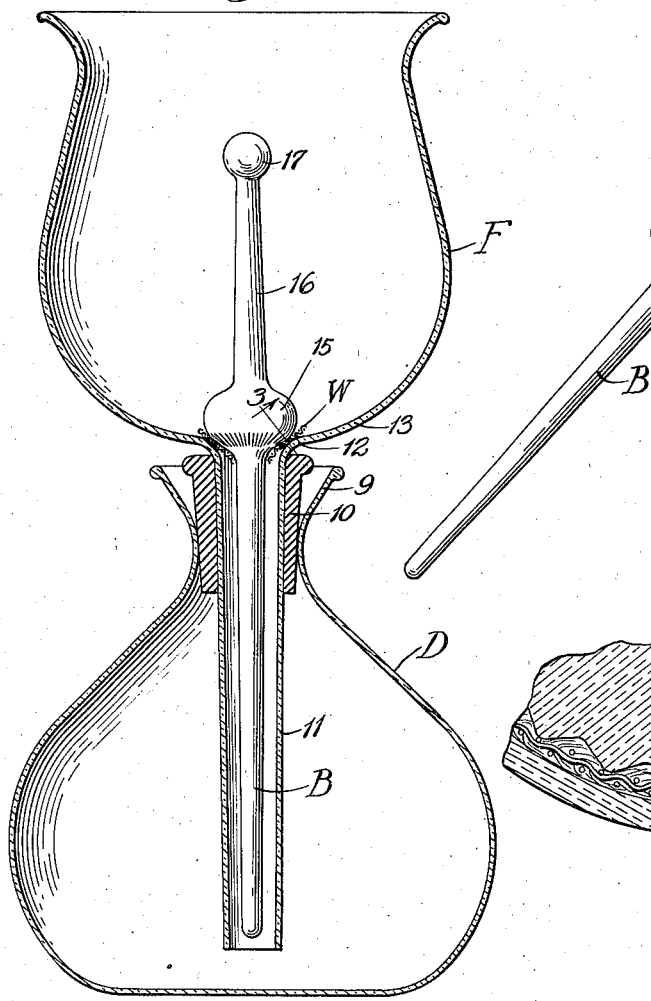
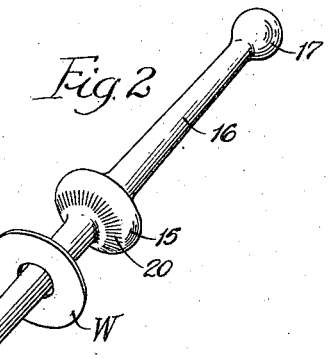
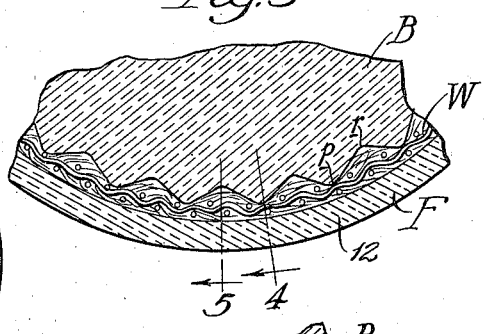
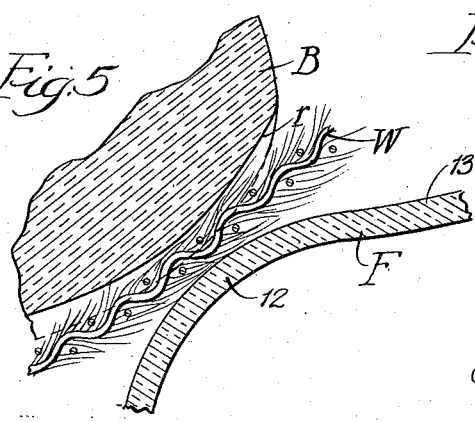
Inventor: Harvey Cory,
By Blemmy & Blemmy
Attys.

Patented Oct. 20, 1936

2,058,136

UNITED STATES PATENT OFFICE 2,058,136

VACUUM COFFEE BREWER

Harvey Cory, Chicago, Ill.

Application May 28, 1936, Serial No. 82,222

3 Claims. (Cl. 53—3)

This invention relates generally to a coffee brewing utensil of the vacuum type, in which is included two vessels, one a decanter and the other a funnel, the latter having a tubular stem depending into the decanter for sealed connection therewith. More particularly, the present improvements are directed to a filtering unit disposed within the funnel adjacent its base for straining fluid passing between the funnel and the decanter.

It is an object of my invention to devise for the purposes noted a filter device which is simple in the extreme, inexpensive to produce, easy to clean, and otherwise readily adaptable to meet the needs of a vacuum coffee brewer. My improved filter, together with the holder or mounting therefor, meets all these requirements, it is easily removable upon occasion, it is devoid of metal parts which might be considered objectionable, and it provides a strainer element which will not readily clog, which offers little or no resistance to the upflow of air, steam and water, and which may be readily cleaned, removed or replaced. In particular, the present improvements have to do with the strainer element and its cooperation with the holder or mounting therefor, and with the cooperating funnel seat with which it engages.

These and other objects of my invention are realized by the construction which is herein shown and described, a suggestive embodiment whereof is illustrated in the accompanying drawing wherein—

Figure 1 is a central longitudinal section through a vacuum coffee brewer showing in elevation the filter unit in operative position;

Fig. 2 is a view in perspective of the filter unit per se;

Fig. 3 is a detail in section, on an enlarged scale, taken on line 3 of Fig. 1; and Figs. 4 and 5 are details in section, taken, respectively, on lines 4 and 5 of Fig. 3.

The coffee brewer illustrated which is of the vacuum type comprises a decanter D adapted to be rested upon or over a heater (not shown). Fitted within the neck 9 of the decanter is a bushing 10 through which is extended a tubular stem 11 depending from a funnel F. A handle (not shown) may be connected to the neck of the decanter, as is usual.

The funnel stem which is open at its lower end extends downwardly into the decanter close to the bottom thereof. At its upper end the stem rounds outwardly as at 12 to provide a seat which joins with the base 13 of the funnel which, as shown, may be in the general form of a cup-shaped bowl. It will be understood that the decanter may be made of heat-proof glass in one piece, and that the funnel with its depending stem may also be produced in the same way of like material.

The filter unit shown separately in Fig. 2 comprises a bar B, desirably of heat-proof glass, having, by preference, a slight taper from each end toward its middle upper region where it is outwardly swelled to provide a generally spherical body or ball 15. At its upper end the bar may be equipped with a head 17. The ball is adapted to engage with and rest upon the seat of the funnel where it establishes a circular line contact therewith. I provide around the ball, in the region of its circular line of contact, a plurality of short grooves 20 extending in planes which are radial to the axis of the bar, as best shown in Fig. 3. These grooves which are preferably in adjacent relation are generally angular in form so as to provide narrow ribs $p$ with intervening recesses $r$. It is the ribs alone which are enabled to make contact with the seat of the funnel; the recesses, however, afford narrow passages through which communication is maintained between the decanter and funnel.

As part of the filter unit I provide a strainer washer W adapted to be fitted upon the bar in a position adjacent the ball. This washer is desirably produced from a single thickness of fabric by a blanking operation, and when in operative position will surround the grooves 20 therein. In practice, the washer will rest upon the funnel seat to separate the ball therefrom along the circular line of contact just referred to. The fabric material of which the washer is made will be compressed opposite each of the ribs $p$, but elsewhere, opposite in the recesses $r$, will be loose and unconfined.

In operation, water is placed in the decanter, the funnel is fitted in position, and the filter unit with washer attached is then rested in its position upon the seat. Fresh roasted coffee which is preferably pulverized so as to facilitate extraction of the aromatic oils from its cells, is poured into the funnel to the desired amount. Upon heating the water in the decanter, a pressure of air or steam is developed which is directed against the strainer element. In response to this pressure which is followed by upflow of water, the strainer will permit the water to pass upwardly through the recesses $r$ into the funnel to produce an infusion. When substantially all the water in the decanter has passed into the funnel, the heat is shut off. With consequent cooling of the decanter a vacuum or minus pressure is produced which draws the infusion back from the funnel. In this return or downflow, the infusion is required to pass through the strainer before entering the decanter. During this stage of the operation, the strainer, opposite the ribs p, is compressed tightly upon the filter seat so as to substantially close the openings at such points against the passage of liquid. Between these ribs, however, i. e., within the recesses, the washer fabric is loose and free to expand so as to function after the manner of a wick to permit free seepage of the infusion therethrough. Through such portions of the washer-strainer as are unconfined and free of pressure, the liquid will pass, but without permitting grounds or other particles to go through.

The surfaces of the ball and seat may be convex, as shown, so that the contact therebetween is in the form of a circular line. This line, however, is broken by the series of ribs which define spaced points of engagement. Accordingly the circular line of contact is broken into a number of closely spaced points arranged circularly about the seat. It is at these points only that the strainer is compressed. Elsewhere, both above, below and between the points of contact, the strainer is relatively unconfined and so may swell in the presence of liquid to promote a capillary drainage therethrough. By reason of the point-contact relationship described, the efficiency of the strainer is enhanced so that there will be a minimum of resistance to the flow of liquid from which all particles, grounds, etc., are separated during passage of the coffee infusion downwardly into the decanter.

The resulting brew is what may be termed a true coffee infusion in that it is not contaminated with derivatives of metals or other materials which are wholly absent from inside the decanter and funnel. The brew is crystal clear and distinctly superior in flavor.

I claim:

1. In a vacuum coffee brewer, the combination of two communicating vessels in sealed connection, there being a circular line seat in the line of communication therebetween, and a filter unit adapted to rest upon the seat, the filter unit comprising a bar extended lengthwise through the line of communication and formed with a ball adapted to rest upon the seat, the ball being formed with a plurality of closely spaced adjacent ribs arranged in planes radially of the bar axis and defining between them a series of recesses, the ribs being so disposed as to engage the circular line seat, and a flexible strainer in the form of a washer fitted upon the bar and against the ball to rest upon the seat and receive contact only in a circular line from the ribs of the ball whereby the strainer material between the ribs and on opposite sides of the circular line is loose and free to swell for promoting capillary drainage of liquid therethrough.

2. In a vacuum coffee brewer, the combination of two communicating vessels in sealed connection, there being a seat in the line of communication therebetween, and a filter unit adapted to rest upon the seat, the filter unit comprising a ball having a series of closely spaced parallel ribs arranged in planes radially of the line of communication axis and defining between them intervening recesses, the ribs being positioned to engage the seat, and a flexible strainer interposed between the ball and seat and receiving pressure from the ribs alone whereby the strainer material in the intervening recesses is loose and free to swell for promoting capillary drainage of liquid therethrough.

3. In a vaccum coffee brewer, the combination of two communicating vessels in sealed connection, there being a circular convex seat in the line of communication therebetween, and a filter unit adapted to rest upon the seat, the filter unit being formed with a convex surface having a series of closely spaced parallel ribs arranged in planes radially of the line of communication axis and defining between them intervening recesses, the ribs being bowed from end to end and adapted for point contact with the seat, and a flexible strainer interposed between the seat and convex surface of the filter unit and receiving pressure from a point on each rib whereby the strainer material in the intervening recesses and above and below the circular line of contact is loose and free to swell for promoting capillary drainage of liquid therethrough.

HARVEY CORY.